July 18, 1961 R. N. WALLACE 2,992,838
PIPE JOINT HAVING HEATED SEALING MEANS
Filed Jan. 9, 1958
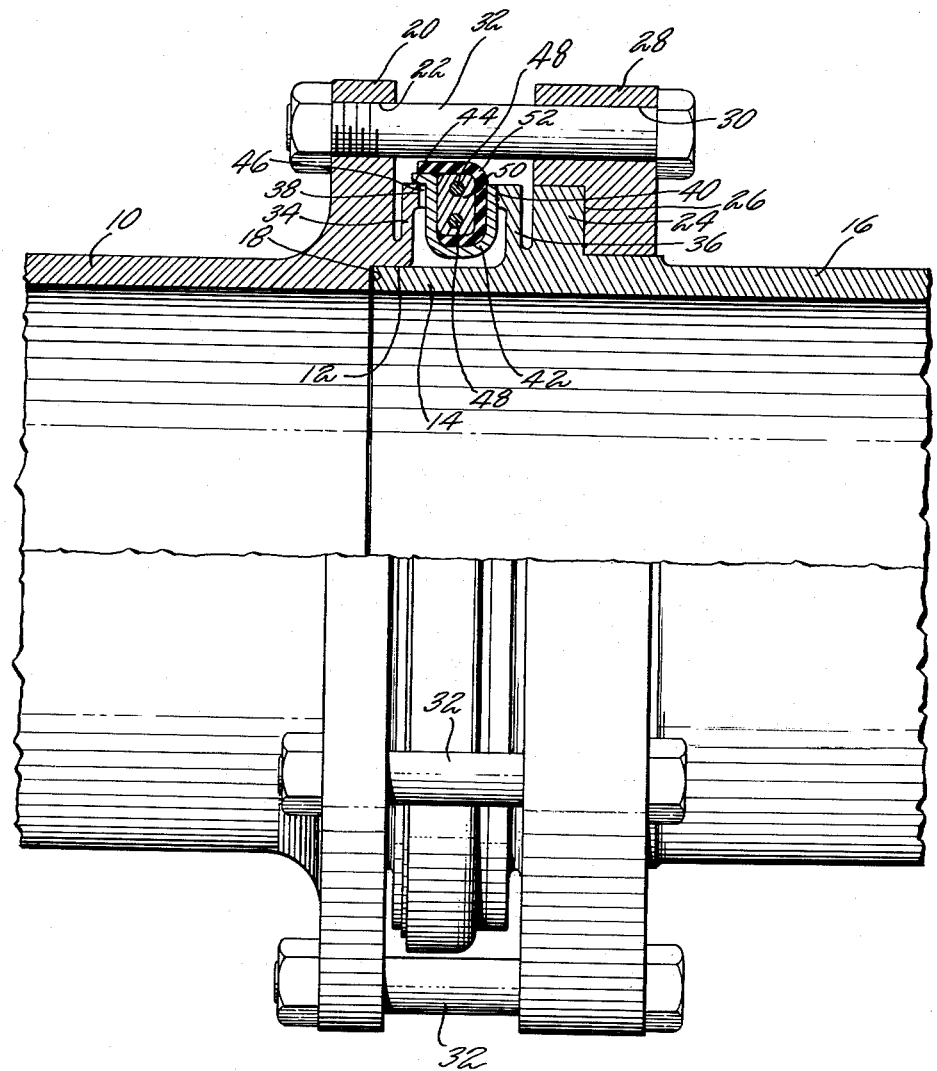
INVENTOR
RUDOLF N. WALLACE
BY
ATTORNEY ature of the parts carrying the thermoplastic sealing strip, these parts constantly urge the sealing strip into sealing engagement with the flange on the end of the mating pipe so that any creep or give which may occur in the bolted connection will not open up the seal.

United States Patent Office
2,992,838
Patented July 18, 1961

2,992,838
PIPE JOINT HAVING HEATED SEALING MEANS
Rudolf N. Wallace, Glastonbury, Conn., assignor to United Aircraft Corporation, East Hartford, Conn., a corporation of Delaware
Filed Jan. 9, 1958, Ser. No. 707,902
5 Claims. (Cl. 285—21)

This invention relates to sealed joints, such as pipe joints, and particularly to an improved seal and means for making and breaking the seal for such joints.

It is an object of the invention to provide a separable joint, which has a mechanical connection sealed by a thermoplastic material and which has means for heating said material at will to make or break the seal.

Another object of the invention is to provide improved resilient mounting means for the parts to be connected by the thermoplastic material, thus greatly facilitating the assembly and sealing of the joint.

A further object of the invention is to provide a seal construction for a rigidly, mechanically connected joint in which the sealing member is flexibly mounted and is constantly urged into sealing engagement by its flexible mount so that creep or give in the mechanical connection will not break the seal.

A further object of the invention is to provide a joint assembly having a mechanical connection and a seal connection produced by means incorporated in the joint assembly.

A yet further object of the invention is to provide a construction for such a sealed joint enabling the seal to be made or broken without access to the joint so that hidden or inaccessible joints can be sealed.

A further object of the invention is generally to improve the construction and performance of sealed joints.

These and other objects and advantages of the invention will be evident or will be point out in connection with the following detailed description of a preferred embodiment of the invention shown in the accompanying drawing.

In this drawing, the single figure shows a side elevation, partly in section, of a pipe joint embodying the invention.

As herein shown, a pipe 10 has an annular recess 12 in its open end which serves to pilot the mating end 14 of a pipe 16, the bottom 18 of the recess forming an abutment to limit the telescoping engagement of the two pipes. Pipe 10 has an outstanding annular flange 20 having a series of holes 22 arranged in an annular row adjacent its circumference. Pipe 16, likewise, has an outstanding annular flange 24 forming a shoulder 26 for the engagement of a clamping ring 28, which is provided with a series of bolt holes 30 which register with the holes 22 in flange 20. A series of clamping bolts 32 extend through flange 20 and ring 28 and serve to draw the pipes 10 and 16 together until the end 14 of pipe 16 seats on abutment 18.

The sealing means for the joint includes an outstanding annular flange, or fin, 34 on the end of pipe 10 and a similar outstanding annular flange, or fin, 36 on pipe 16. These fins are provided with annular confronting faces 38 and 40, respectively, which are spaced apart from each other by reason of the fact that fin 36 is located a considerable distance back from the end of pipe 16. The fins 34 and 36 have a cross section such that they provide a limited amount of resilience to forces applied in an axial direction.

A resilient generally U-shaped ring 42 is welded at the extremity of one of its legs to the face 40 of fin 36. It's other leg is slightly longer than the welded leg and has an annular flange 44 which overlies the extremity of fin 34. This flange serves as a guiding means for the free end of ring 42, and also as means for locating an annular strip of thermoplastic material 46 which is placed between face 38 of fin 34 and the confronting face of the free leg of ring 42. Strip 46 may be, for example, a brazing compound which upon the application of heat will produce a bonded or fused seal between the confronting faces.

It should be noted that the dimensions of the parts are such that as bolts 32 draw the two pipe sections together, the strip 46 is compressed between the face 38 and the ring 42 before the end of pipe 16 seats against the abutment 18 of pipe 10. This is possible without requiring extreme accuracy of manufacture by reason of the inherent resilience of the fins 34 and 36 under axially applied pressure and the resilience of ring 42.

Means are provided to heat the thermoplastic strip 46 to effect the seal between face 38 and the confronting surface of ring 42. To this end, two heating wires 48 are imbedded in a mass of electric insulating material 50 within the U-shaped ring 42 and have terminals (not shown) for connection to a suitable source of electric current. These wires may be of any well-known high resistance material which will give off heat when an electric current is passed through them. In order to concentrate the heat from conductors 48 on the thermoplastic strip 46, the insulating mass 50 is enclosed by a sheath 52 of heat insulating material which completely surrounds the mass 50, except for a gap adjacent the free leg of ring 42 where the electrically insulating mass 50 is in contact with the free leg of the ring.

It will be evident that in assembling the joint, the heat insulator 52 and the electrical insulating mass 50 containing the conductors 48 are supported in position in the U-shaped ring 42. Also, the annular thermoplastic strip 46 is assembled within the overhanging flange 44. With the parts thus assembled, the pilot section 14 is inserted in the socket 12 until the thermoplastic strip 42 engages the face 38 of fin 34. The clamping ring and bolts 32 are then assembled and the bolts are tightened to compress strip 46 between face 38 and the confronting face on ring 42. With the parts in this position, it is only necessary to establish the heat circuit through conductors 48 to soften the strip 46 and effect a permanent fluid tight bond between the confronting faces on fin 34 and ring 42. It will be understood that current is applied to the heating wires 48 only long enough to soften the plastic strip 46.

When it is desired to break the join, the bolts 32 are removed and current is supplied to wires 48 long enough to soften the seal formed by plastic strip 46, whereupon pipes 10 and 16 can be readily separated.

The joint may be reused by replacing the assembly including ring 42, strip 46, and the heating and insulating means in the ring, or by clearing the sealing surfaces and renewing the sealing strip.

It will be understood that instead of a bolted flange type of joint a threaded coupling or a V-clamp type of connection could be used.

It will be evident that by this invention it has been made possible to provide a simple and inexpensive joint between two pipe sections which is capable of containing liquids at high temperatures and pressures, for example, liquid metals which have high temperatures and also are very corrosive. It will also be evident that a joint has been provided which can be very easily opened when desired. Further, the bonded seal producing elements are all carried by the joint assembly so that it is not necessary to have access to the joint to make and break the seal. This is of particular advantage when hidden or inaccessible joints are encountered or when radioactivity is a problem.

It will also be noted that by reason of the resilient support for the seal provided by ring 42 and, to a lesser degree, by fins 34 and 36, slight movements in the mechanical connection provided by the bolted flanges due to expansion and contraction, for example, will not break the seal.

It is to be understood that the invention is not limited to the specific embodiment herein illustrated and described, but may be used in other ways without exceeding the scope of the invention.

I claim:

1. A joint for connecting two tubular members, one of said members having a telescoping pilot section receivable in the other member for axially aligning said members and for limiting their telescoping movement, outstanding flanges adjacent the ends of said members, means for drawing said flanges toward each other to bring said pilot section into abutting relation with said other member, and sealing means between said flanges including an outstanding fin on each of said members, a peripheral U-shaped ring having the extremity of one leg permanently secured to the end of one of said fins and having a surface at the extremity of its other leg resiliently abutting a surface adjacent the end of said other fin when said flanges are drawn together, a thermoplastic material between said abutting surfaces, electric heating means disposed within said ring for fusing said thermoplastic material upon passing a current through said heating means, electric insulating means surrounding said heating means, and means for concentrating the heat from said heating means on said thermoplastic material including heat insulating material surrounding said electric insulating material having a gap adjacent said thermoplastic material.

2. A fluid-tight and rigid joint between two tubular telescoping members comprising, an annular outstanding fin on each member, a U-shaped resilient ring between said fins having its parallel legs outstanding and having the extremity of one of said legs welded to the extremity of the fin on one of said members, an annular surface on the extremity of the fin on said other member facing the free leg of said ring, an annular flange on the end of said free leg overlying the end of the adjacent fin, an annular strip of the thermoplastic material located between said annular surface and the free leg of said ring and adapted to be held in position by the resilience of said ring when said members are drawn together, means for limiting the telescoping movement of said members, electrical heating means extended around said ring between said legs, electrical insulating means enclosing said heating means, heat insulating means extending from said flange on the end of said free leg about said electrical insulating means and terminating short of said free leg of said ring, an annular outstanding flange on each of said members, and means for drawing said last-mentioned flanges together.

3. A joint for rigidly connecting two tubular members in a fluid-tight manner, one of said members having a telescoping pilot section receivable in the other for axially aligning said members and for limiting their telescoping movement, rigid outstanding annular flanges adjacent the ends of said members, means for drawing said flanges toward each other to bring said pilot section into abutting relation with said other member, and sealing means between said rigid flanges, said sealing means including an outstanding annular fin on each of said members spaced from said rigid flanges, the thinness ratio of said fins providing considerable resilience therein, a peripheral U-shaped ring of resilient material having its parallel legs outstanding, said ring having the extremity of one of its legs permanently welded to the extremity of one of said fins and having an annular surface at the extremity of its other leg resiliently urged into approximate abutting relation with an annular surface on the other fin when said rigid flanges are drawn together to seat said pilot section, a thermoplastic material located and pressed between said resiliently urged surfaces on said fin and ring, electrical heating means disposed between the outstanding legs of said U-shaped ring for fusing said thermoplastic material upon passing a current through said heating means, electric insulating material surrounding said heating means, and means for concentrating the heat from said heating means on said thermoplastic material including heat insulating material surrounding said electric insulating material having a gap along the leg of said ring which abuts said thermoplastic material.

4. A joint as defined in claim 3 in which the confronting faces of said fins have mutually inwardly directed annular projections at their extremities which cooperate with the legs of said ring.

5. A joint as defined in claim 4 in which the free leg of the U-shaped ring has an annular terminal flange which overlies the inwardly directed annular projection of the adjacent fin.

References Cited in the file of this patent

UNITED STATES PATENTS

| | | |
|---|---|---|
| Re. 24,365 | Klein | Oct. 1, 1957 |
| 1,863,855 | Jenkins | June 21, 1932 |
| 1,926,107 | Moorehead | Sept. 12, 1933 |
| 2,667,865 | Herman | Feb. 2, 1954 |
| 2,732,229 | Gaum | Jan. 24, 1956 |

FOREIGN PATENTS

| | | |
|---|---|---|
| 686,387 | Great Britain | Jan. 21, 1953 |